(12) United States Patent
Tsang et al.

(10) Patent No.: US 6,710,841 B2
(45) Date of Patent: Mar. 23, 2004

(54) FLEXIBLE LIQUID CRYSTAL DISPLAY

(75) Inventors: Peter Tjin Sjoe Kong Tsang, Eindhoven (NL); Andrew Johnston Moore, Brighton (GB); Jonathan Farringdon, Southborough (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 6 days.

(21) Appl. No.: 10/095,554

(22) Filed: Mar. 12, 2002

(65) Prior Publication Data

US 2003/0007118 A1 Jan. 9, 2003

(Under 37 CFR 1.47)

(30) Foreign Application Priority Data

Mar. 14, 2001 (EP) .............................................. 01302383

(51) Int. Cl.$^7$ ............................................. G02F 1/1333
(52) U.S. Cl. ...................................................... 349/158
(58) Field of Search ................................. 349/155, 156, 349/158, 142, 144, 73

(56) References Cited

U.S. PATENT DOCUMENTS

| 4,682,858 A | * | 7/1987 | Kanbe et al. | ................ 349/156 |
| 5,164,853 A | * | 11/1992 | Shimazaki | .................... 349/73 |
| 5,399,390 A | | 3/1995 | Akins | ............................ 428/1 |

* cited by examiner

Primary Examiner—Robert H. Kim
Assistant Examiner—Richard Kim

(57) ABSTRACT

This invention relates to a liquid crystal display device (1) having a first and a second substrate (2, 3), being manufactured in a flexible material. A liquid crystal material is disposed between the substrates (2,3). Together, the substrates form an array of cell enclosures (8), each containing an amount of liquid crystal (6). Further, each of said cell enclosures (8) is separated from the adjacent enclosures by intermediate flexible parts (7).

13 Claims, 2 Drawing Sheets

FLEXIBLE LIQUID CRYSTAL DISPLAY

This invention relates in general to a liquid crystal display device, and more particularly to a liquid crystal display device comprising a first and a second substrate, being manufactured in a flexible material, and a liquid crystal material being disposed between said substrates.

There is today a fast growing market for different kinds of displays utilising liquid crystal technology. Most of these displays comprise two plane substrates, commonly fabricated by a rigid glass material, and a layer of a liquid crystal material, arranged in-between said substrates. The glass substrates are separated from each other by equally sized spacers being positioned between the substrates, thereby creating a more or less uniform gap between the substrates. Further, electrode means for creating an electric field over the liquid crystal material are provided and the substrate assembly is then placed between crossed polarizers to create a display. Thereby, optical changes in the liquid crystal display may be created by applying a voltage to the electrode means, whereby the optical properties of the liquid crystal material disposed between the electrodes is alterable.

However, a problem with this kind of display is that they, due to the glass substrates, are quite rigid, heavy and exhibit a very low tolerance for bending stresses. Under bending moments the display tends to lose its image over a large area, due to the fact that the gap between the substrates changes, thereby causing the liquid crystal material to flow away from the bending area, resulting in a changed crystal layer thickness. Further, as glass is a fragile material, there is also a risk for breakage. A further disadvantage with using glass substrates is a complicated manufacturing procedure, due to the fact that the glass substrates must be handled with great delicacy.

Consequently, displays utilising glass substrates are less suitable, when a more flexible or even bendable display is desired.

Some efforts have been made in the field of exchanging the above described glass substrates with substrates of a less fragile material, such as plastic. Plastic substrates provide for lighter and less fragile displays. One display using plastic substrates are described in the patent document U.S. Pat. No. 5,399,390. However, the natural flexibility of the plastic substrates presents problems, when trying to manufacture liquid crystal displays in a traditional manner. For example, the spacing between the substrates must be carefully monitored in order to provide a display with good picture reproduction. An aim in the production of prior art displays utilising plastic substrates has therefor been to make the construction as rigid as possible, more or less imitating glass substrates. Thereby the flexible properties of the substrates have not been utilised to the full extent.

Therefore, one object of the present invention is to overcome the above-mentioned problems with the prior art, and to provide an improved liquid crystal display being flexible.

These and other objects are accomplished with a liquid crystal display device comprising a first and a second substrate, being manufactured in a flexible material, and liquid crystal material being disposed between said substrates, whereby said display device is characterised in that said substrates together form an array of cell enclosures, each containing an amount of liquid crystal material, whereby each of said cell enclosures is separated from the adjacent enclosures by intermediate flexible parts. By creating a display from a flexible material, and subdivide the display into a plurality of cell enclosures, and separating the enclosures from each other by flexible intermediate areas, a flexible, bendable display is created. Due to the configuration a bending moment on the display will cause a bending along an intermediate part rather than through a liquid crystal filled cell, thereby maintaining the display quality, since the cells or "pixels" of the display are left intact. If, however, bending should cause deformation of one or more cells along a bending path, the loss of display quality will still be local, due to the separate enclosures, thereby maintaining the picture over a large area of the display.

Preferably, said first and second substrates are constituted by a first and a second polymeric sheet, respectively, said substrates being brought together in contact areas, together forming a grid-like pattern, whereby said cell enclosures are formed between said contact areas. This construction enables easy manufacturing, in which a layer of liquid crystal is sandwiched between two sheets of a flexible polymeric material. Thereafter, an array of enclosures is formed by creating a grid-like pattern of contact between the two sheets. The contact areas may be joined by melting, gluing or the like.

Further, the interior of each cell enclosure is suitably isolated from the interior of the surrounding enclosures. Thereby liquid crystal escape to neighbouring cells as a result of flexing or bending is prevented, and thereby any picture distortion caused by flexing may be limited to a rather confined area of the display.

Preferably, said cell enclosures is filled with a liquid crystal material, so as to establish an inner pressure in each cell in order to maintain the cell shape. By using the inner pressure to maintain the shape of the enclosure, and thereby the local distance between the enclosure substrates in each cell, the need for spacers is terminated. By using the inner pressure of each cell to maintain the distance between the substrates, bending of the display is less probable to cause cell distortions, as flexing movements are easily taken up by the flexible intermediate parts between said cells.

Suitably, electrode structures and/or polarizer structures are printed directly onto the substrate, which results in easy manufacturing and mounting, since the number of separate components is reduced.

Finally, said cell enclosures are essentially rectangular and equally sized in order to provide a pixel pattern and in order to maximise the active cell area of the display.

These and other aspects of the invention will be apparent from the preferred embodiment hereinafter described in greater detail, with reference to the accompanying drawings.

Figure 1:
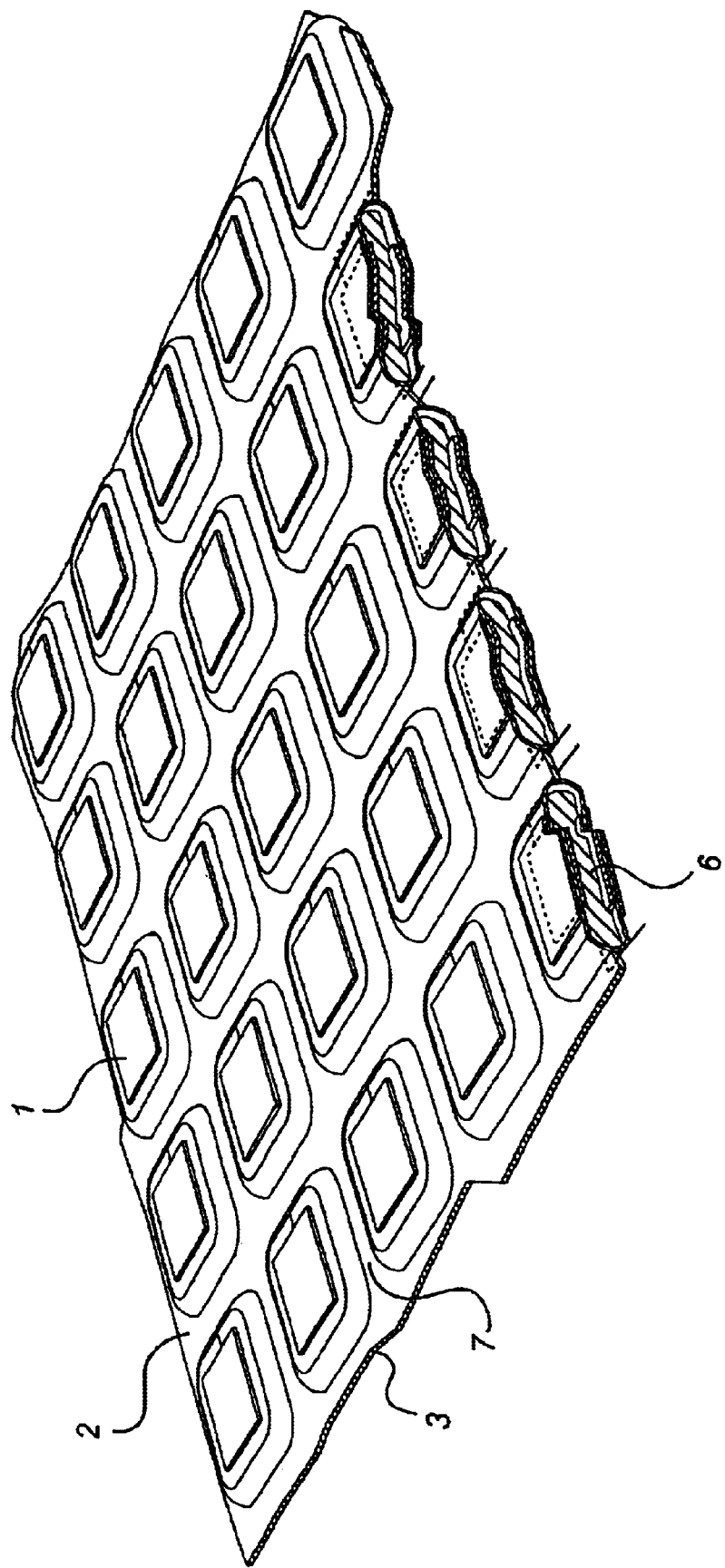
FIG. 1 is a perspective view of a segment of a display in accordance with the invention.
Figure 2:
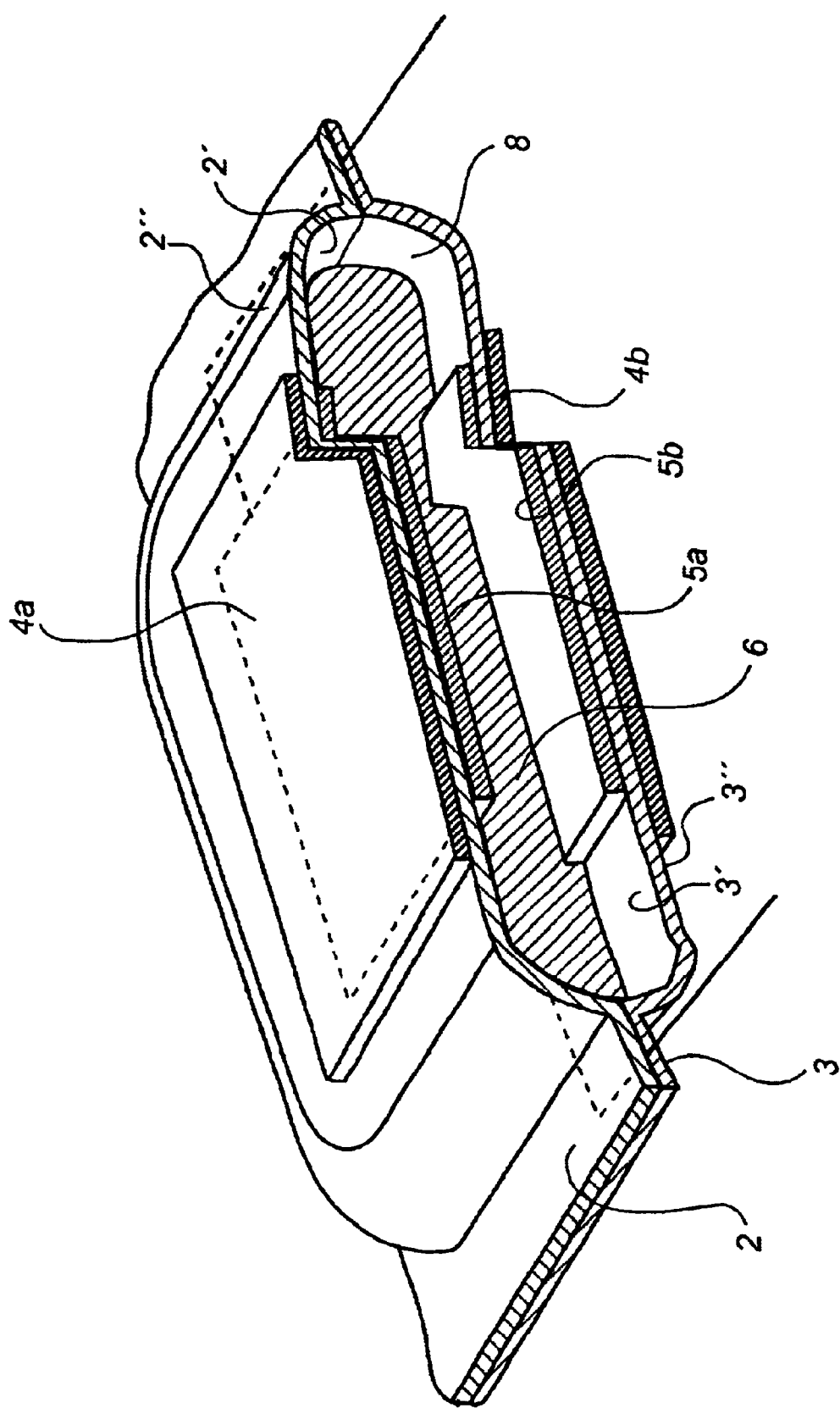
FIG. 2 is a perspective view of the display in FIG. 1, showing a part of the display in closer detail.

FIG. 1 and FIG. 2 discloses a presently preferred embodiment of a segment of a display 1 in accordance with the present invention. The display 1 comprises a first 2 and a second 3 substrate, each formed of a thin, flexible sheet or film of a polymer material. Each substrate 2, 3 has an inner 2', 3' and an outer 2", 3" surface, respectively. Each of said outer surfaces 2", 3" are partly coated with a polarising layer 4a, 4b. Further, a transparent electrode layer 5a, 5b creating a pattern of electronic tracks and segment electrodes are printed directly upon each of said inner surfaces 2', 3'. The above-described printing may be done using various conventional techniques. To form the display 1 the first and second substrates 2, 3 are sandwiched together, with their respective inner surfaces 2', 3' facing each other. Further, the substrates 2, 3 are partly interconnected with each other along a first set of more or less equally spaced paths, essentially extending over the full width of the substrates, and a second set of corresponding paths, said first and second sets of paths together forming a gridiron interconnection pattern 7. Said interconnection may be accomplished by melting, gluing or the like. In this way, the substrates together form an array or matrix of enclosures 8, or "plastic bubbles", each enclosure being defined by one section of the gridiron pattern and by the inner surfaces 2', 3' of the first and second substrate respectively. In each such enclosure, an amount of liquid crystal material 6 is encapsulated. Further, each enclosure 8 is fluidly isolated from the others by means of said interconnection pattern 7, thereby disabling liquid crystal material to move between the cells of the display 1.

The amount of liquid crystal in each cell enclosure is chosen to establish an inner pressure in the cell enclosure 8 in order to maintain a preferred cell shape. Further, by utilising the inner pressure in the cell in order to maintain an appropriate distance between the substrates i.e. the preferred cell shape, spacers are not necessary. In the preferred embodiment the preferred cell shape is essentially quadratic, with a comparatively large first and a second substrate area being essentially parallel with each other. Further, portions of the parallel areas are covered with electrode 5a, 5b and polarizer 4a, 4b segments, as described above and as seen in FIGS. 1 and 2. The areas of the segment electrodes and the polarizers are small in respect to total surface area of the cell enclosure in order to ensure parallel spacing between the two flexible substrates when the enclosure is filled with liquid crystal material and thereby ensuring a uniform intensity when operated. Further each of said electrodes is connected with a separate electronic conductive track, leading to the edge of the flexible display sheet. Thereby, each cell enclosure may be individually controlled by connecting each of the conductive tracks to a control circuit (not shown) on per se known manner.

Each cell enclosure 8 is formed to constitute a pixel in a larger display 1. Due to the fact that the pixels are in the form of cells with an intermediate flexible spacing or gap, and due to the fact that the substrates are manufactured from a flexible material, the display is highly flexible. Further, since the inner pressure in each cell seeks to maintain the cell shape, any bending moment will primarily be taken up by the flexible intermediate parts. Thereby, it is possible to keep a sharp and clear picture over essentially the entire display, even during bending or the like. Even if some cells in a bending area should be deformed, thereby losing all or some of its displaying function due to changes in distance between the substrates, this loss of function is confined to a rather limited area of the display, since the cells are not in connection with each other, but functions independently from each other.

Further, each cell enclosure 8 is isolated from the surrounding cells. Thereby, a leakage of liquid crystal due to damage on one or several enclosures will be limited to the damaged area, resulting in a small over-all degradation of the display 1.

Each of the above described cells 8 functions as a regular liquid crystal display, and this will not be described in closer detail herein. Further, it goes without saying that the display may be multiplexed on per se known manner in order to provide a colour display.

By manufacturing the display from two polymeric sheets and creating a cell pattern by joining the two sheets in a grid-like pattern, thereby creating isolated individual cell enclosures, this kind of display may be done with a minimum of joints, resulting in a display that is virtually waterproof. Further it enables the manufacturing of wearable displays, due to the above-described flexibility. A further advantage with a display in accordance with the invention is that it is easily scalable, due to the tiling possibility.

A display device in accordance with the invention may be used in a broad range of applications. For example, the flexible display may be used on clothing, in order to provide logotypes or entire garments having changeable colours and/or patterns. Furthermore a device in accordance with the invention is usable for billboards, advertising and the like. The above-described flexible, wearable and easily scalable display device provides for the creation of displays in virtually any shape. Further, the fact that the display may be done practically waterproof provides for a durable and even washable construction. Moreover, the message of a billboard using the above-described device is easily changeable. Another possible application of the invention is to create packaging with readily changeable appearance.

A display device in accordance with the invention may also be used as a camouflage skin for tanks etc. The display device may then be connected to a camera device, which provides an operating unit, connected with the display, with information regarding colours and structures of the surroundings. Thereafter, the operating unit may create a camouflage pattern on the display that is specially adapted to the specific surroundings of the tank, making it virtually impossible to discover visually.

While the preferred embodiment of the invention have been illustrated and described, it shall be understood that the invention is not limited to this embodiment. Numerous modifications, changes and variations will be obvious for those skilled in the art, without departing from the scope of the invention as described by the appended claims. For example, said cells may have a circular rather than quadratic form. Further it may also be possible to manufacture the cells from a more rigid material, while the intermediate areas are manufactured from a more flexible material in order to even more effectively avoid bending and pixel distortions of the cells.

What is claimed is:

1. A liquid crystal display device comprising a first and a second substrate, being manufactured in a flexible material, and liquid crystal material being disposed between said substrates, characterized in that said substrates together form an array of cell enclosures, each containing an amount of liquid crystal material, whereby each of said cell enclosures is separated from the adjacent enclosures by intermediate flexible parts.

2. A display device as in claim 1, wherein said first and second substrates are constituted by a first and a second polymeric sheet, respectively, said substrates being brought together in contact areas, together forming a grid-like pattern, whereby said cell enclosures are formed between said contact areas.

3. A display device as in claim 2, wherein the interior of each cell enclosure is isolated from the interior of the surrounding enclosures.

4. A display device as in claim 3, wherein each of said cell enclosures is filled with a liquid crystal material, so as to establish an inner pressure in each cell in order to maintain the cell shape.

5. A display device as in claim 2, wherein a conductor layout structure, comprising a plurality of conductor areas each covering a part of an enclosure, is printed directly onto each of said sheets, on the side facing the interiors of said enclosures.

6. A display device as in claim 5, wherein a polarizer structure, comprising a plurality of polarising areas each covering a part of an enclosure, is printed directly onto each of said sheets, on the opposite side of said printed conductor layout structure.

7. A display device as in claim 1, wherein said enclosures are essentially rectangular and equally sized.

8. A liquid crystal display device comprising;

a first flexible substrate and a second flexible substrate that form an array of cell enclosures in which individual cell enclosures are separated by flexible parts; and a liquid crystal material disposed in said cell enclosures.

9. A display device as in claim 8 wherein said first and second substrates are comprise of polymeric sheets.

10. A display device as in claim 8 wherein said cell enclosures are filled with sufficient liquid crystal material to establish an inner pressure that maintains the shape of said cell enclosures.

11. A display device as in claim 8, further including a plurality of conductors, each of which covers part of an associated cell enclosure, on an interior surface of said first substrate.

12. A display device as in claim 11 further including a polarizer structure on an exterior surface of said first substrate.

13. A display device as in claim 8, wherein said cell enclosures are substantially rectangular and equally sized.

* * * * *